United States Patent [19]

Merrick

[11] Patent Number: 5,779,319
[45] Date of Patent: Jul. 14, 1998

[54] CHILD SEAT RETRACTOR

[75] Inventor: David D. Merrick, Cicero, Ind.

[73] Assignee: Indiana Mills and Manufacturing, Inc., Westfield, Ind.

[21] Appl. No.: 794,681

[22] Filed: Feb. 3, 1997

[51] Int. Cl.$^6$ .................. A47D 15/00; A62B 35/00
[52] U.S. Cl. .............. 297/484; 297/475; 297/476; 297/250.1
[58] Field of Search .................... 297/484, 476, 297/475, 474, 250.1

[56] References Cited

U.S. PATENT DOCUMENTS

| | | | |
|---|---|---|---|
| 3,915,402 | 10/1975 | Takada | 297/476 X |
| 4,293,105 | 10/1981 | Weman | 297/475 X |
| 4,456,196 | 6/1984 | Takada et al. | 297/475 X |
| 4,679,852 | 7/1987 | Anthony et al. | 297/250.1 X |
| 4,720,148 | 1/1988 | Anthony et al. | 297/476 X |
| 4,732,409 | 3/1988 | Colasanti | 297/476 X |
| 4,790,601 | 12/1988 | Burleigh et al. | 297/484 |
| 4,940,193 | 7/1990 | Grabowski | 297/475 X |
| 5,039,169 | 8/1991 | Bougher et al. | 297/484 |
| 5,242,213 | 9/1993 | Föhl | 297/476 X |
| 5,286,090 | 2/1994 | Templin et al. | 297/480 X |
| 5,367,917 | 11/1994 | Hishon et al. | 297/476 V |
| 5,380,066 | 1/1995 | Wiseman et al. | 297/476 |
| 5,398,997 | 3/1995 | McFalls | 297/484 X |
| 5,503,461 | 4/1996 | Schreier | 297/484 |
| 5,511,856 | 4/1996 | Merrick et al. | 297/476 |
| 5,516,199 | 5/1996 | Crook et al. | 297/476 X |
| 5,549,356 | 8/1996 | Gray | 297/484 X |

FOREIGN PATENT DOCUMENTS 2 175 194  11/1986  United Kingdom.

*Primary Examiner*—Peter M. Cuomo
*Assistant Examiner*—Rodney B. White
*Attorney, Agent, or Firm*—Woodard, Emhardt, Naughton Moriarty & McNett

[57] ABSTRACT

A retractor for controlling the withdrawal of a belt therefrom actuated by movement of a locking bar extension. The retractor frame having a spring biased rotatably mounted spool wrappingly receives one end of the belt harness, the opposite end of the belt harness having fixed thereto either a buckle or a buckle tongue. Attached to a seat is a pivoting crotch stalk including either a buckle or a buckle tongue that receives the corresponding mating part of the buckle tongue combination which is attached to the buckle harness. A locking bar with attached extension is engageable with the ratchet shaped end plates of the spool to prevent further withdrawal of the belt harness. The pivoting crotch stalk engages the extension causing movement of the locking bar into contact with the ratchet shaped end placed, thereby preventing the spool from rotating to allow any further withdrawal of the belt harness. In an alternative embodiment, the locking bar extension extends into the slot of the buckle and upon insertion of the tongue causes movement of the locking bar into the ratchet wheel.

15 Claims, 5 Drawing Sheets

CHILD SEAT RETRACTOR

BACKGROUND OF THE INVENTION

1. Field of the Invention

This invention is in the field of retractors typically used for seat belts and child safety seats.

2. Description of the Prior Art

Many patents have been granted that disclose automatic belt retracting devices having a spring biased spool to normally withdraw the belt into the retractor, but yieldable to allow the belt to be withdrawn therefrom and attached at the opposite end to a buckle or tongue. Typically, the prior art spools include a ratchet configured end plate that is lockingly engaged by a spring biased locking bar pivotally mounted to the retractor frame. Many of the prior art retractors have means for automatically holding the locking bar out of the locking position until a sufficient amount of belt has been withdrawn from the retractor. One such approach has been to provide a belt follower engaged with the bar that will hold the bar out of position until a sufficient amount of belt has unwrapped from the spool. Another approach is to provide a gearing mechanism or cam plate that holds the bar away from the locking position until the spool has rotated to a predetermined angle. The various mechanisms, including the cam plate, hold the locking bar out of the locking position until the retractor spool is slightly rewound. Once the locking bar is allowed to pivot into a locking position, the retractor is operable to prevent further withdrawal of the belt from the retractor. Thus, if the desired or necessary amount of belt is not withdrawn from the retractor prior to attaching the opposite end of the belt to a tongue or a buckle, and if the spool is allowed to slightly rewind, the retractor will automatically lock, preventing further belt withdrawal and possibly attachment of the belt to the tongue or buckle. In such a case, the belt must be completely rewound onto the retractor spool, resulting in considerable inconvenience to the user.

Disclosed in U.S. Pat. No. 4,720,148 is a mechanism for deactivating the cam plate and locking bar of a child seat retractor until the tongue attached to the opposite end of the belt is inserted into a buckle, whereupon the cam plate is released, allowing the locking bar to lockingly engage the retractor spool. It is also known to provide a locking bar which engages the ratchet spool only when the tongue and buckle are interengaged, such as shown in U.S. Pat. No. 3,915,402, or to provide a mechanism to contact and normally hold the locking bar in the removed position until the tongue is inserted into the buckle. Alternative design approaches have been suggested that include rotating the cam plate or to provide a non-automatic manual actuator for independent operation of the cam plate.

It is also known to provide a child seat for mounting atop an automobile seat with the child seat having a harness for securing a child therein, such as shown in U.S. Pat. Nos. 5,380,066; 4,679,852; and 4,720,148. It is also known to provide on a child seat a retractor with the aforementioned mechanism for directly contacting and holding the locking bar for the controlled withdrawal of the child seat harness. Pat. No. 5,380,066 issued to Wiseman et al., discloses a manual pushbutton control that causes movement of the locking bar away from the ratchet shaped end plates allowing withdrawal of the belt harness from the spool until the pushbutton is released. Upon release of the pushbutton, the locking bar pivots to its normal position in locking engagement with the ratchet shaped end plates preventing further withdrawal of the belt harness from the spool. One disadvantage of this system is that the user must use one hand to disengage the locking bar while using the other hand to adjust the web harness. A further disadvantage is that the actuator assembly between the push button and locking bar requires several components, thus increasing manufacturing time and costs. Despite the prior products, there remains a need for a retractor having a simple release mechanism allowing the user to easily lock and unlock the retractor web spool.

The retractor of the present invention, disclosed herein, incorporates a locking bar extension connected directly to the locking bar and actuated by either a pivoting release lever mounted directly to the child seat or the interengagement of the buckle and tongue.

SUMMARY OF THE INVENTION

One embodiment of the present invention is a retractor for mounting to a child seat having a harness, an interengaged combination of a tongue and seat belt buckle comprising a frame, a spool to wrappingly receive a portion of the harness and having an axle and end walls at least one of which is configured as a ratchet wheel with the spool rotatably mounted to the frame, a first spring mounted to the frame and normally urging the spool to rotate to a retracted position whereat a portion of the harness is wrapped thereon, a locking bar mounted to the frame to be moveable between a removed position whereat the locking bar is located apart from the ratchet wheel and a locking position whereat the locking bar lockingly engages the ratchet wheel limiting movement of the spool, and a release lever pivotally mounted to the child seat and controlling the locking bar between the removed position and the locking position.

Another embodiment of the present invention is a retractor for use with a harness and interengaged combination of a tongue and seat belt buckle having a slot for receiving the tongue, comprising a frame, a spool to wrappingly receive a portion of the harness and having an axle and end walls at least one of which is configured as a ratchet wheel with the spool rotatably mounted to the frame, a first spring mounted to the frame and normally urging the spool to rotate to a retracted position whereat a portion of the harness is wrapped thereon, a locking bar mounted to the frame to be movable between a removed position whereat the locking bar is located apart from the ratchet wheel and a locking position whereat the locking bar lockingly engages the ratchet wheel limiting movement of the spool, a second spring mounted to the frame and normally urging the locking bar to the removed position apart from the ratchet wheel, a locking bar extension having a first and a second end, the first end attached to the locking bar, and the locking bar extension second end extending into the seat belt buckle slot, wherein upon insertion of the tongue into the slot, the locking bar extension urges the locking bar into the locking position.

It is an object of the present invention to provide a new and improved means for deactivating a belt retractor's locking bar.

A further object of the present invention is to provide a new and improved child seat with harness incorporating a belt retractor with means for manually and selectively deactivating the locking bar of the retractor while the harness is being adjusted but which will inhibit further adjustment once the tongue and buckle are interengaged.

Yet another object of the present invention is to provide a retractor for mounting to a child seat having a harness with tongue and buckle with the retractor deactivated by rotating a lever on the child seat.

Still a further object of the present invention is to provide a retractor with a locking bar extension for use with a harness having a tongue and buckle with the retractor deactivated by force transmitted through the locking bar extension upon interengagement of the the buckle and tongue.

Related objects and advantages of the present invention will be apparent from the following description.

DESCRIPTION OF THE PREFERRED EMBODIMENTS

Figure 2:
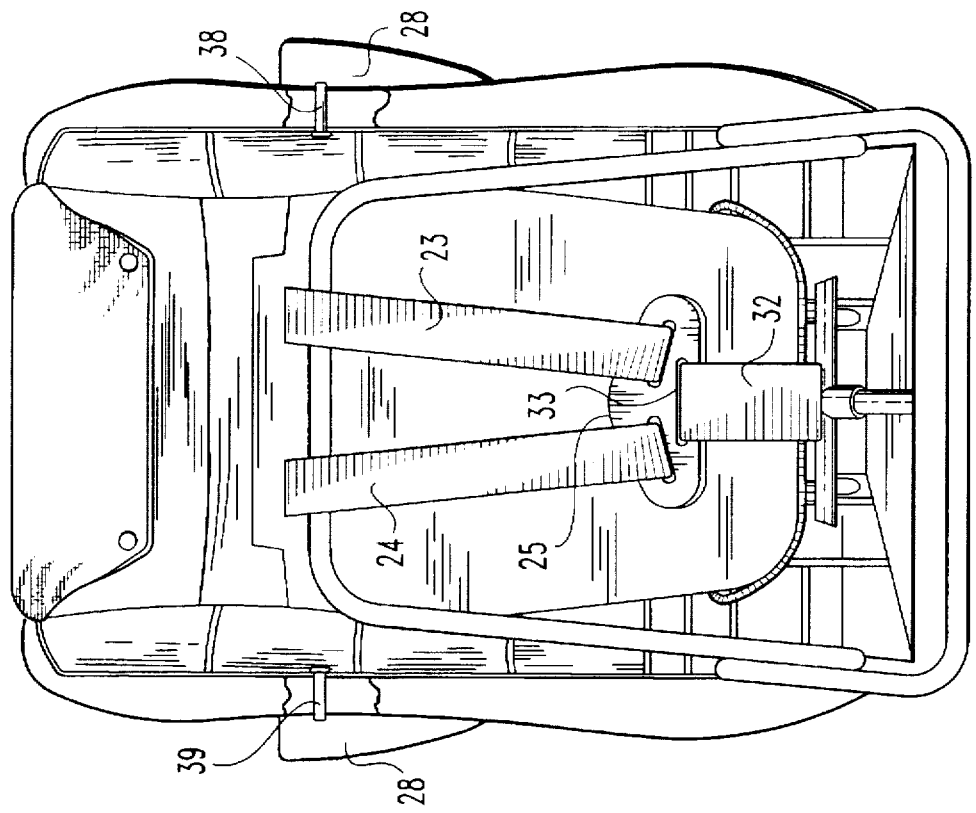
FIG. 2 is a fragmentary rear view of the seat of FIG. 1.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
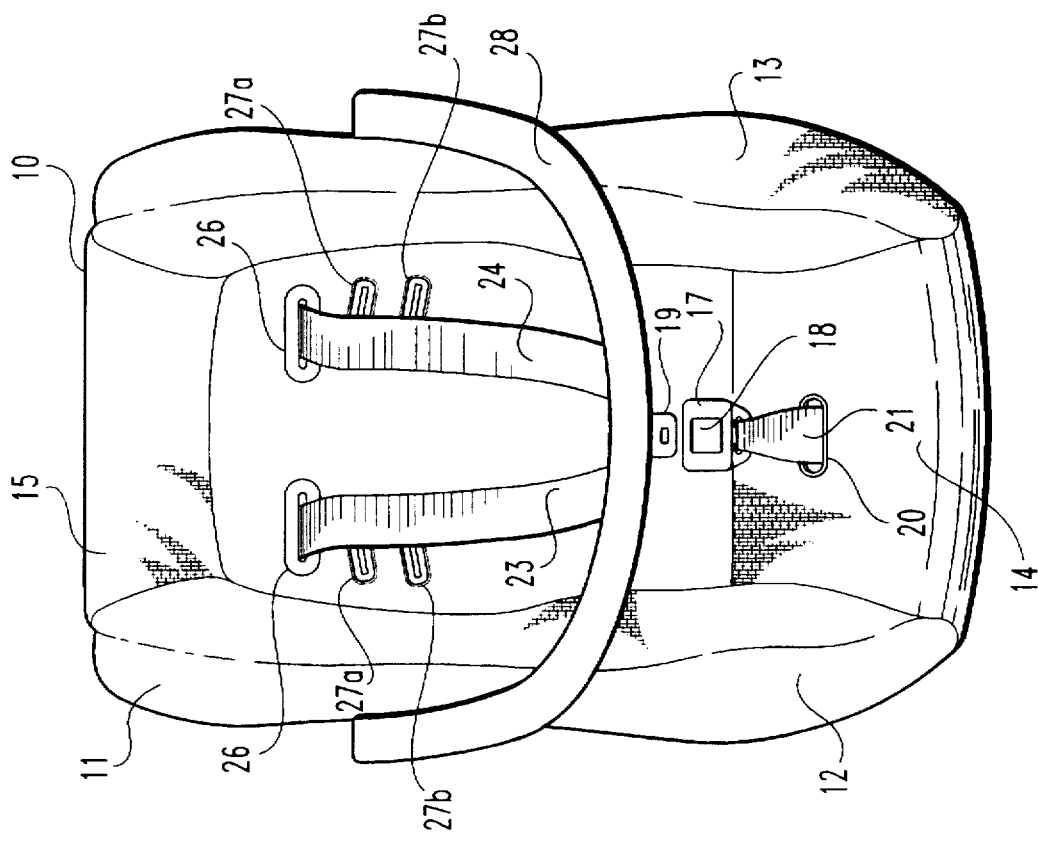
FIG. 1 is a front view of a child seat incorporating an alternative embodiment of the new and improved retractor disclosed herein.

Referring now to the drawings, in FIG. 1 there is shown a child seat 10, which includes an outer frame 11 having a pair of downwardly extending arms 12 and 13, with a cushioned seat area 14 and a cushioned back supporting area 15 located therebetween. A plurality of conventional tubing 35 forms a rear frame 36, which is adjustable to support the child seat 10 at a proper angle upon an automobile seat. Tubing 35 may be utilized to secure the child seat 10 to an automobile seat by any suitable means such as by extending the automobile seat belt securely around tubing 35. In the seat area 14, there is provided a seat belt buckle 17 of conventional construction. A pushbutton 18 of buckle 17 faces outwardly allowing the child seat user to depress the same to release tongue 19. Tongue 19 is mounted on a cushioned arm 28 which receives web portions 23 and 24, each of which extends through the back supporting area 15 of seat 10 and down the rear side of seat 10 (FIG. 2) to a belt connector 25. Cushioned arm 28 is pivotally mounted to the child seat by bolts 38 and 39. Multiple pairs of slots 26 and 27A and 27B are provided in back supporting area 15 of seat 10. Belts 23 and 24 are extended through the upper pair of slots 26 if a large child is to be supported, or through either of the lower pair of slots 27A or 27B if a smaller child is to be supported.

Referring now to FIG. 2, a third web portion 32 has a distal end 33 fixedly secured to belt connector 25, with the proximal end of web portion 32 being wrappingly mounted on a spool 44 (FIG. 4) of a belt retractor 22 of the present invention.

Figure 3:
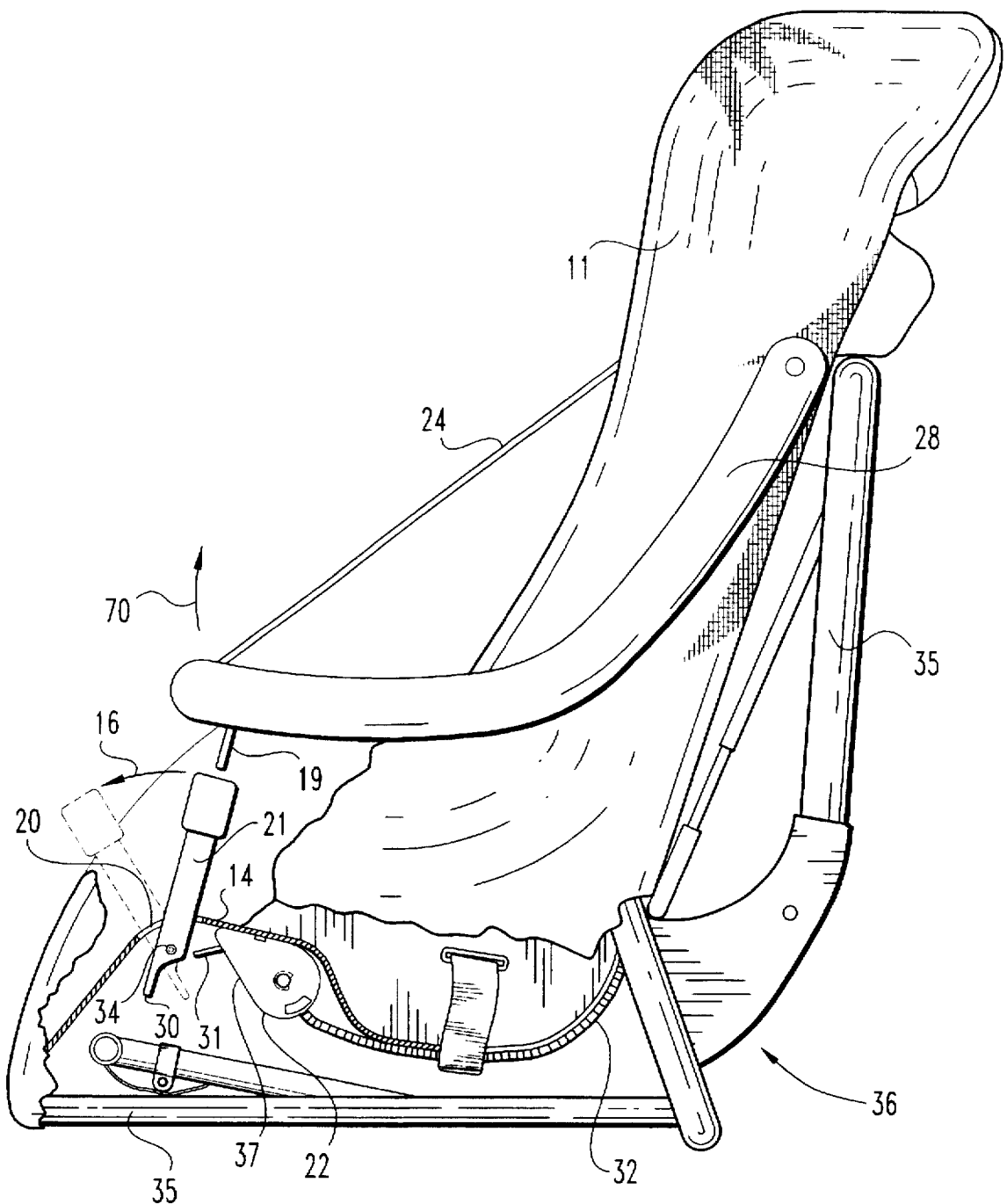
FIG. 3 is a fragmentary side view of the seat of FIG. 1.

The child seat and harness system disclosed in FIGS. 1-3 is illustrative of conventional child seat harness restraint systems and is not intended to limit the invention disclosed, it being understood that there are many alternative child seat harness systems available in the marketplace which can be readily adapted to utilized the present invention. As discussed further, the present invention relates to the improved retractor and actuating mechanism disclosed herein. Referring now to FIG. 3, the child seat of FIGS. 1 and 2 is shown in a left side view in a fragmentary, diagrammatic view. Retractor 22 is mounted below seat area 14 and is further provided with a locking bar extension 31 which extends beyond retractor cover 37.

Crotch stalk 21 is positioned to extend between the legs of a child seated in the child seat and cooperates with the harness system to restrain the child in the child seat. Crotch stalk 21 extends through oblong opening 20 and is pivotally mounted by pin 34 to the child seat. The upper portion of crotch stalk 21 includes buckle 17. Interengagement of tongue 19 and buckle 17 securely fasten the pivoting crotch stalk 21 to the harness system restraining the child in seat 10. The lower portion of crotch stalk 21 extends below pivot pin 34 to form a crotch stalk extension 30. As shown, crotch stalk 21 is positioned such that crotch stalk extension 30 is spaced from locking bar extension 31. It being understood that crotch stalk 21 pivots about pivot pin 34 through opening 20 in the direction of arrow 16 such that crotch stalk extension 30 engages locking bar extension 31. Movement of crotch stalk 21 thereby controls the locking bar of retractor 22 to disengage the ratchet wheels and allow withdrawal of web portion 32.

Figure 4:
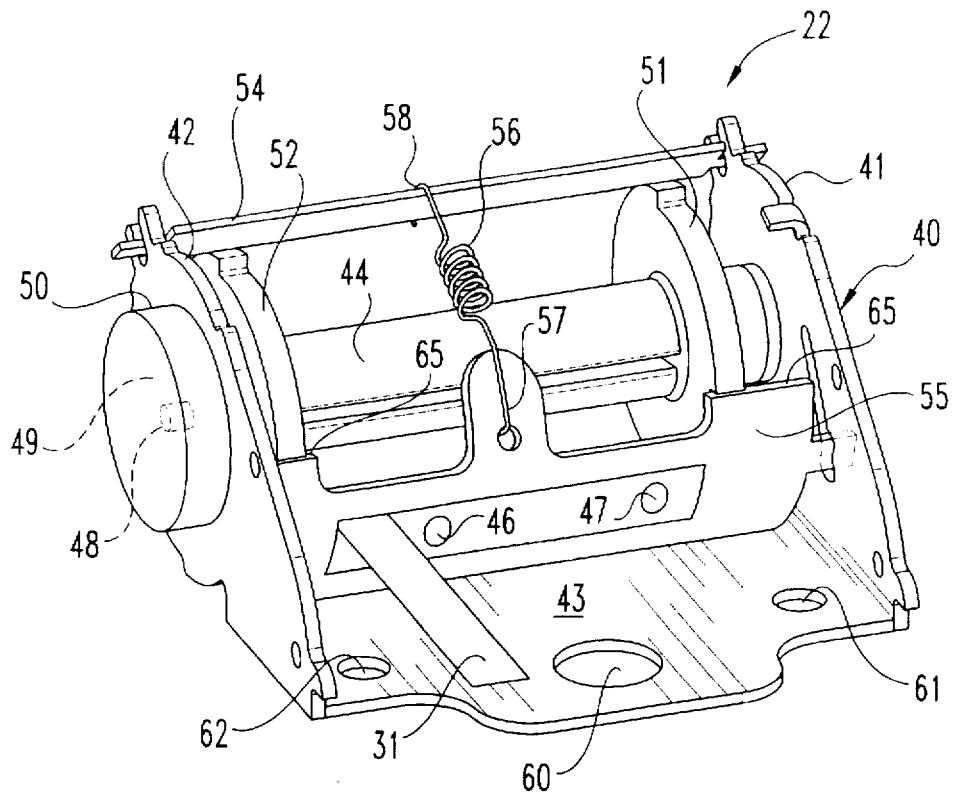
FIG. 4 is an enlarged perspective view of a first preferred embodiment of the new and improved retractor disclosed herein.
Figure 5:
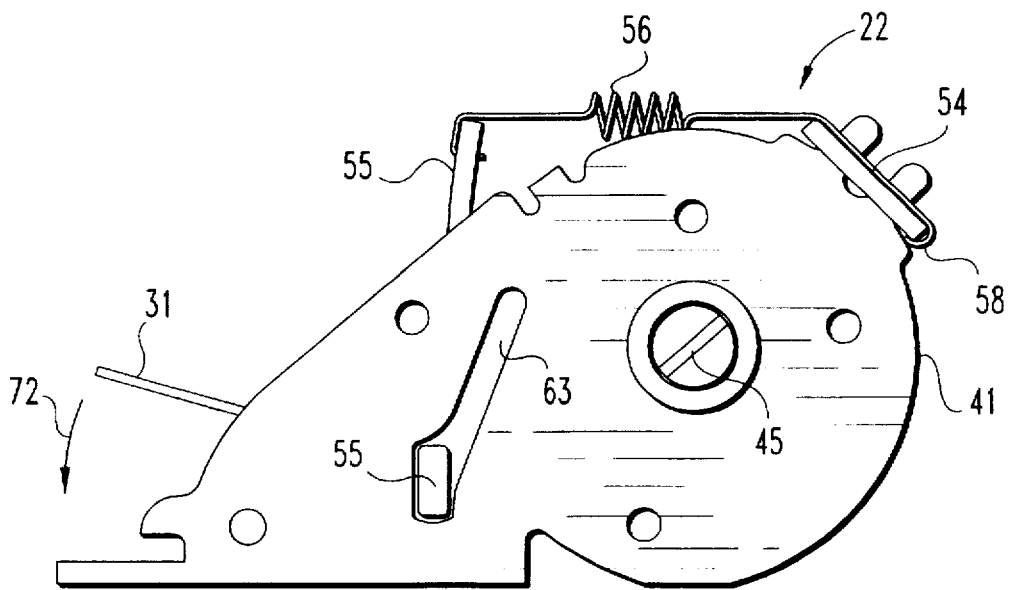
FIG. 5 is an enlarged right-side view of the retractor of FIG. 4.

Referring now to FIG. 4, retractor 22 of the present invention includes a U-shaped frame 40 having a pair of spaced apart sidewalls 41 and 42 that are integrally joined together by a bottom wall 43. An additional cross-member 54 extends between and secures the sidewalls 41 and 42 of the retractor frame together. Bottom wall 43 is further provided with attachment holes 61 and 62, as well as clearance hole 60. A retractor spool 44 is rotatably mounted to and between sidewalls 41 and 42, and includes an axle 45 (FIG. 5) extending through sidewalls 41 and 42. One end 48 of axle 45 extends through sidewall 42 and is attached to a helical spring 49 provided within cover 50. The helical spring is operable to urge axle 45 to rotate and withdraw web portion 32 onto spool 44 of retractor 22, but is yieldable to allow for the withdrawal of web portion 32 from spool 44.

A pair of ratchet shaped end plates 51 and 52 form ratchet wheels which are fixedly attached to axle 45 immediately inward of sidewalls 41 and 42. Plates 51 and 52 rotate with spool 44 as web portion 32 is pulled from or withdrawn onto the spool. A spring biased locking bar 55 has opposite ends which extend through sidewalls 41 and 42 and is pivotal in slot 63 from a locking position in which locking bar 55 engages ratchet shaped end plates 51 and 52 of spool 44, thereby restricting the movement of spool 44, to a removed position in which the locking bar is freed from its locking engagement with ratchet end plates 51 and 52, allowing spool 44 to rotate to permit web portion 32 to be withdrawn from spool 44. A wire spring 56 has one end 57 attached to locking bar 55 and an opposite end 58 attached to cross-member 54. The wire spring 56 is operable to normally urge locking bar 55 into the locking position and thus into engagement with ratchet shaped end plates 51 and 52, such that ends 65 of locking bar 55 may enter into contact with the ratchet shaped end plate and block further withdrawal of web portion 32 from spool 44.

A retractor with a locking bar and ratchet shaped end plates associated with the retractor spool, is conventional in nature and is similar to the retractor disclosed in the commonly owned U.S. Pat. No. 5,511,856 which is incorporated herein by reference. The improvement of the present invention includes fixedly mounting a locking bar extension 31 by rivets 46 and 47 to locking bar 55. Locking bar extension 31 provides an effective means to control the position of locking bar 55, as well as simplifying manufacture and assembly of the retractor.

Retractor 22 is mounted to a child seat frame or in certain cases, a child seat may be originally installed with the vehicle main seat, in which case the retractor is not mounted to the child seat frame but instead is mounted to the vehicle main frame or the vehicle main frame seat frame.

Crotch stalk 21 is pivotally mounted to child seat 10 such that when pivoted outwardly to the adjustment position in the direction of arrow 16, crotch stalk extension 30 engages locking bar extension 31 to overcome the force of spring 56 and moves locking bar extension 31 in the direction of arrow 72 (FIG. 5), thereby moving locking bar 55 out of engagement with ratchet shaped end plates 51 and 52. With crotch stalk 21 in the adjustment position, spool 44 is free to rotate and web portion 32 may be withdrawn as desired. As shown in FIG. 3, cushioned arm 28 may be pivoted in the direction of arrow 70 to permit a child seat occupant to be placed or removed from the child seat. Upon pivoting crotch stalk 21 inwardly to the restraining position in a direction opposite arrow 16, crotch stalk extension 30 disengages locking bar extension 31 and spring 56 normally urges locking bar 55 into engagement with ratchet shaped end plates 51 and 52. Cushioned arm 28 may be pivoted in a direction opposite arrow 70 to interengage tongue 19 and buckle 17, thereby restraining the child seat occupant and inhibiting movement of crotch stalk 21.

Many variations are contemplated and included in the present invention. For example, crotch stalk 21 may contain a tongue and cushioned arm 28 may contain a buckle. Moreover, various harness configurations are presently available on the market, many of which may be adapted to utilize the present invention. Further, instead of utilizing a release lever which is an integral part of the harness restraint system, a separate lever may be pivotally mounted to the car seat frame to provide an alternative means to control locking bar 55.

Figure 6:
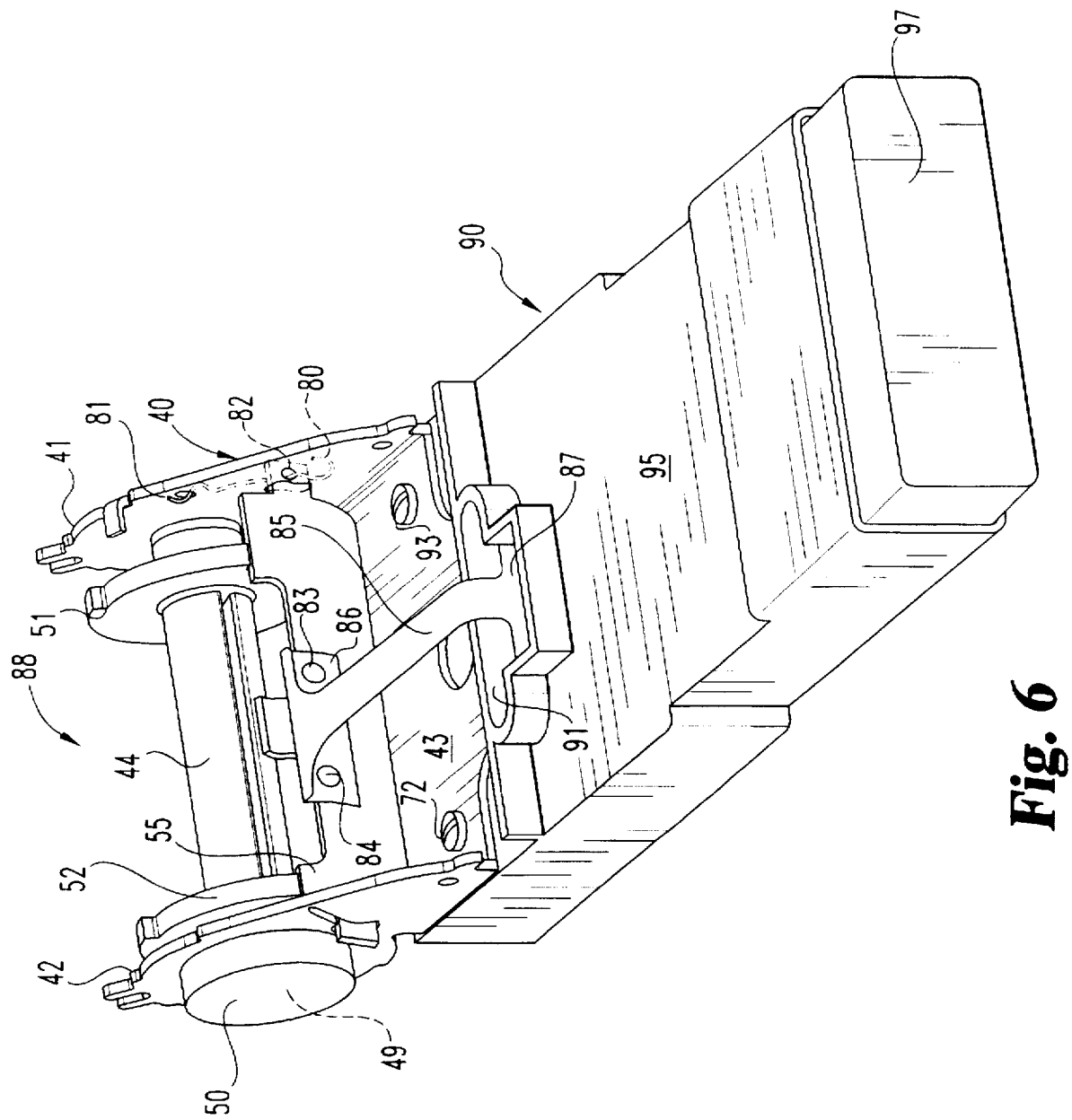
FIG. 6 is an enlarged perspective view of a second preferred embodiment of the new and improved retractor disclosed herein attached to a buckle assembly.

An alternative design of the retractor of the present invention is shown in FIG. 6. Similar to the embodiment shown in FIG. 4, retractor 88 includes a U-shaped frame 40 having a pair of spaced apart sidewalls 41 and 42 that are integrally joined together by a bottom wall 43. A retractor spool 44 is rotatably mounted to and between sidewalls 41 and 42 and includes a pair of ratchet shaped end plates 51 and 52. As with the embodiment shown in FIG. 4, a helical spring 49 provided within cover 50 is operable to urge spool 44 to rotate and withdraw web portion 32 onto spool 44, but is yieldable to allow for withdrawal of web portion 32 from spool 44. The embodiment of FIG. 6 further includes wire spring 80 having a first end 81 attached to sidewall 41 and a second end 82 attached to locking bar 55, such that spring 80 normally urges locking bar 55 out of engagement with ratchet shaped end plates 51 and 52.

Figure 7:
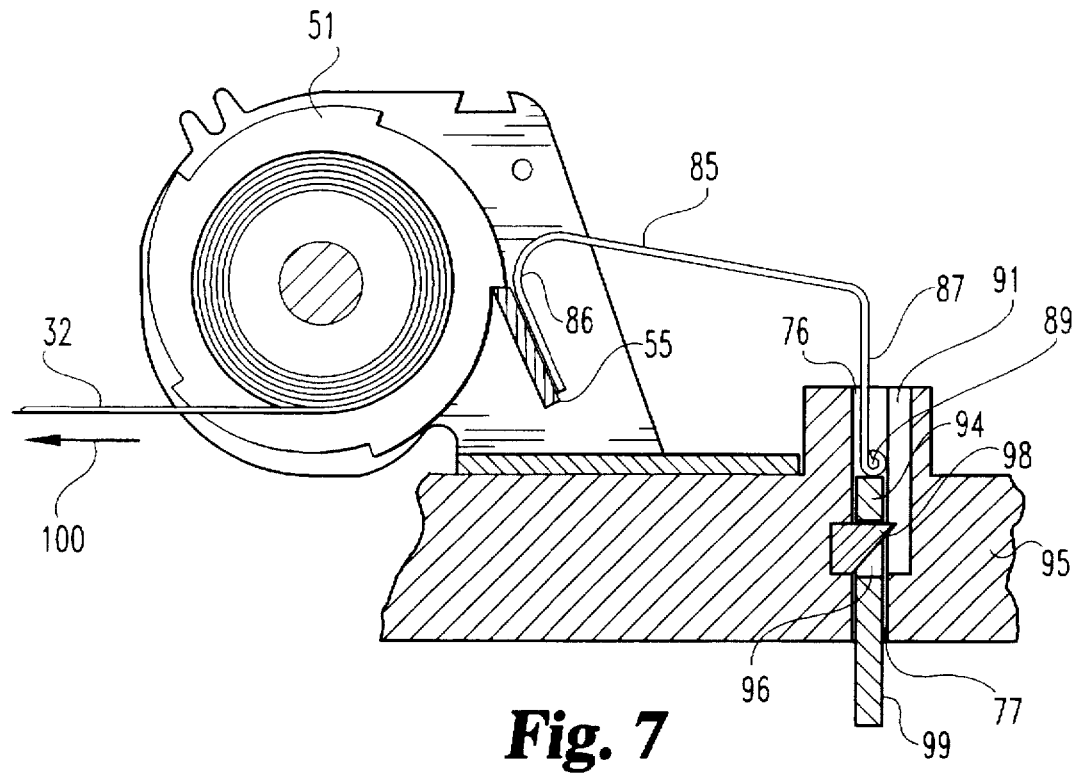
FIG. 7 is an enlarged fragmentary left-side view of the retractor of FIG. 6 and showing the ratchet wheel and spring biased locking bar in the normal locking position, limiting withdrawal of belt material from the retractor spool.
Figure 8:
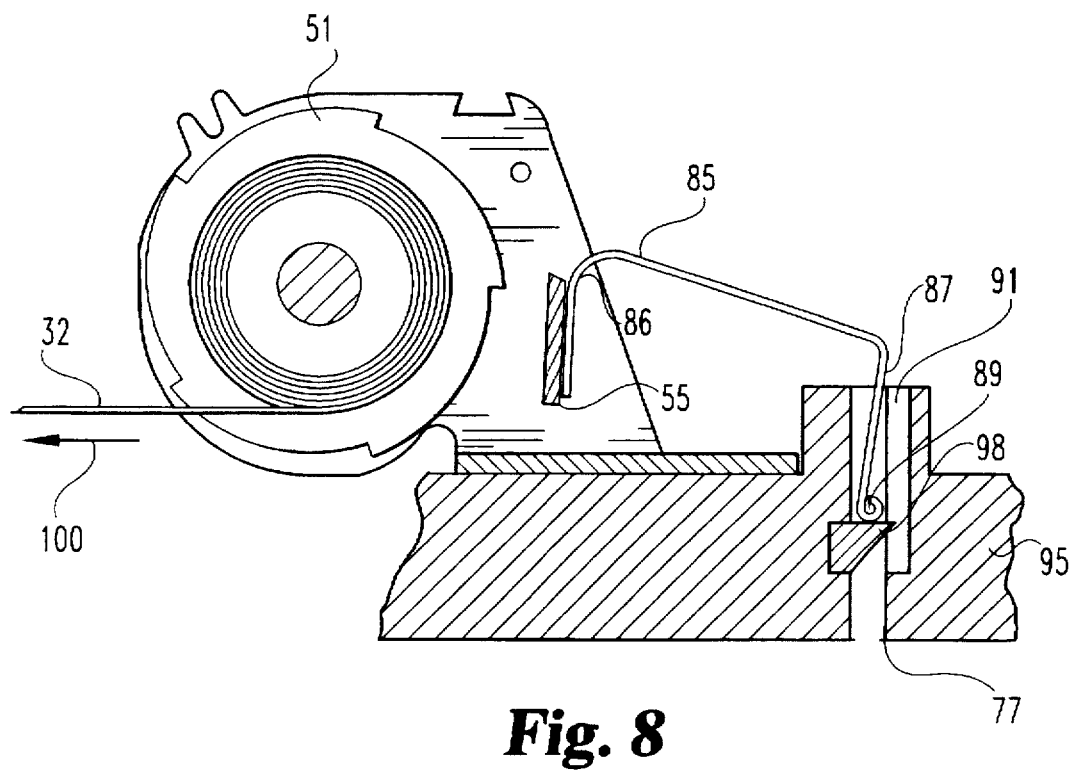
FIG. 8 is the same view as FIG. 7, only showing the spring-biased locking bar in the removed position, freeing the retractor spool to allow withdrawal of belt material.

In this embodiment, retractor 88 is mounted on buckle assembly 90 by bolts 92 and 93. The buckle assembly is of conventional nature and includes a slot 91 for receiving tongue 99 and as shown in FIGS. 7 and 8, spring biased locking member 98 engages tongue opening 96 to secure tongue 99 in slot 91 until released. As is well known in the art, pushbutton 97 moves within buckle assembly body 95 to overcome the spring force normally urging locking member 98 into tongue opening 96 and to withdraw locking member 98 from tongue opening 96 and out of engagement with tongue 99. With locking member 98 removed, tongue 99 may be readily withdrawn from slot 91.

The present embodiment includes a locking bar extension 85 having a first end 86 fixedly attached to locking bar 55 by rivets 83 and 84, and a second end 87 of locking bar extension 85 extending into the rear end 76 of slot 91. As a result of the arrangement of the components in the illustrated embodiment, locking bar extension 85 is formed of a relatively flexible material, i.e. spring steel, to conform to the curvatures required, yet sufficiently rigid to transmit force applied at the second end 87 to the first end 86, thereby controlling locking bar 55.

Referring now to FIGS. 7 and 8, upon insertion of tongue 99 into the front end 77 of slot 91, leading edge 94 of tongue 99 engages locking bar extension 85 at curled edge 89 thereby forcing locking bar extension 85 to move within slot 91 away from locking member 98. This force is transmitted along locking bar extension 85 to overcome the spring force of spring 80 and thereby urge locking bar 55 into engagement with ratchet shaped end plates 51 and 52. Engagement of locking bar 55 with ratchet end plates 51 and 52 prevents rotation of spool 44 about axis 45 and therefore prevents withdrawal of web portion 32 in the direction of arrow 100. In the absence of tongue 99 in slot 91, wire spring 80 urges locking bar 55 out of engagement with end plates 51 and 52 and urges locking bar extension 85 to extend further into slot 91. In this position, spool 44 is free to rotate about axle 45 and thus web portion 32 may be withdrawn in the direction of arrow 100.

For this embodiment of the present invention, buckle assembly may be mounted to a child seat or to a vehicle main seat frame such that tongue 99 may be readily inserted into slot 91 and the user has access to pushbutton 97. Alternatively, a buckle assembly of conventional construction may be located on a child seat or vehicle main seat frame adjacent the retractor disclosed herein, with the locking bar extension extending into the slot of the buckle.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A child seat retractor, comprising:

a child seat having a harness and interengaged combination of a tongue and a seat belt buckle, said harness having a portion;

a frame attached to said child seat;

a spool to wrappingly receive said portion of said harness and further having an axle and end walls at least one of which is configured as a ratchet wheel, said spool rotatably mounted to said frame;

a first spring mounted to said frame and normally urging said spool to rotate to a retracted position, whereat said portion of said harness is wrapped thereon;

a locking bar mounted to said frame to be movable between a removed positions whereat said locking bar is located apart from said ratchet wheel, and a locking position, whereat said locking bar lockingly engages said ratchet wheel limiting movement of said spool; and a crotch stalk pivotally mounted to said child seat, said crotch stalk pivotal with respect to said child seat between an adjustment position and a restraining Position, said crotch stalk when in said adjustment position controlling said locking bar in said removed position and when in said restraining position controlling said locking bar in said locking position.

2. The retractor of claim 1, wherein said crotch stalk further includes said seat belt buckle.

3. The retractor of claim 1, further including a second spring mounted to said frame and normally urging said locking bar to engage said ratchet wheel.

4. The retractor of claim 1, further including a locking bar extension having a first end fixedly attached to said locking bar and a second end, wherein said crotch stalk engages said second end to control said locking bar between said removed position and said locking position.

5. The retractor of claim 4 further including a second spring mounted to said frame and normally urging said locking bar to engage said ratchet wheel.

6. The retractor of claim 1, further including a locking bar extension with a first end attached to said locking bar and a second end;

a second spring mounted to said frame and normally urging said locking bar to engage said ratchet wheel; and wherein said release lever is a crotch stalk including said seat belt buckle, said crotch stalk engaging said locking bar extension second end in said adjustment position, thereby controlling said locking bar to said removed position.

7. The retractor of claim 6, wherein said crotch stalk is spaced from said locking bar extension second end in said restraining position.

8. A retractor for use with a harness and interengaged combination of a tongue and a seat belt buckle having a slot for receiving said tongue, comprising:

a frame;

a spool adapted to wrappingly receive a portion of a harness, said spool further having an axle and end walls at least one of which is configured as a ratchet wheel, said spool rotatably mounted to said frame;

a first spring mounted to said frame and normally urging said spool to rotate to a retracted position, whereat said portion of said harness is wrapped thereon;

a locking bar mounted to said frame to be movable between a removed position, whereat said locking bar is located apart from said ratchet wheel, and a locking position, whereat said locking bar lockingly engages said ratchet wheel limiting movement of said spool;

a second spring mounted to said frame and normally urging said locking bar to said removed position apart from said ratchet wheel; and a locking bar extension having a first end and a second end, said locking bar extension sufficiently rigid to transmit force applied at said second end to said first end, said first end attached to said locking bar and said second end extending into a seat belt buckle slot, wherein upon insertion of a tongue into said seat belt buckle slot, said locking bar extension urges said locking bar into said locking position.

9. The retractor of claim 8, wherein said frame is attached to a seat belt buckle assembly.

10. The retractor of claim 8, wherein said seat belt buckle slot has a front end and a rear end, said front end receiving said tongue and said rear end receiving said locking bar extension.

11. The retractor of claim 8, where said tongue has a leading edge opposite said harness and said leading edge abuttingly engages said locking bar extension.

12. The retractor of claim 11, wherein said locking bar extension includes an intermediate section between said first end and said second end, said intermediate section disposed at an angle with respect to said second end.

13. A retractor for use with a child seat having a harness and interengaged combination of a tongue and seat belt buckle, comprising:

a frame;

a spool to wrappingly receive a portion of a harness and further having an axle and end walls, at least one of which is configured as a ratchet wheel, said spool rotatably mounted to said frame;

a first spring mounted to said frame and normally urging said spool to rotate to a retracted position, whereat said portion of said harness is wrapped thereon;

a locking bar mounted to said frame to be movable between a removed position, whereat said locking bar is located apart from said ratchet wheel, and a locking position, whereat said locking bar lockingly engages said ratchet wheel limiting movement of said spool;

means for controlling said locking bar between said removed position and said locking position, said means for controlling having an attachment portion, said attachment portion attached to said locking bar; and a lever having an engagement end adapted to engage said means for controlling, said lever pivotable with respect to the child seat between an engaged position, wherein said engagement end engages said means for controlling, and a disengaged position, wherein said engagement end is spaced from said means for controlling.

14. The retractor of claim 13, wherein said means for controlling includes a second spring mounted to said frame and normally urging said locking bar to said locking position, and a locking bar extension having a first end defining said attachment portion, said locking bar extension being attached to said locking bar, and a second end engaged by said engagement end of said pivotal lever.

15. The retractor of claim 13, wherein said pivotal lever comprises a crotch stalk pivotally mounted to a child seat.

* * * * *